United States Patent
Ackley et al.

(10) Patent No.: US 9,736,358 B2
(45) Date of Patent: Aug. 15, 2017

(54) SYSTEM AND METHOD FOR DIMENSIONING

(71) Applicant: Hand Held Products, Inc., Fort Mill, SC (US)

(72) Inventors: H. Sprague Ackley, Seattle, WA (US); Franck Laffargue, Toulouse (FR)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 14/519,211

(22) Filed: Oct. 21, 2014

(65) Prior Publication Data

US 2016/0112631 A1    Apr. 21, 2016

(51) Int. Cl.
| | | |
|---|---|---|
| *G01B 11/30* | (2006.01) | |
| *H04N 5/232* | (2006.01) | |
| *G01B 11/25* | (2006.01) | |
| *H04N 5/225* | (2006.01) | |
| *H04N 5/33* | (2006.01) | |

(52) U.S. Cl.
CPC ......... *H04N 5/23222* (2013.01); *G01B 11/25* (2013.01); *G01B 11/2518* (2013.01); *H04N 5/2256* (2013.01); *H04N 5/33* (2013.01)

(58) Field of Classification Search
CPC . G01B 11/2513; G01B 11/2509; G01B 11/00; G01B 11/25; G01B 11/2545; G01B 2210/50; G01B 11/02; G01B 11/026; G01B 11/03; G01B 11/24; G02B 5/18; G01J 2009/0234; G01J 9/0246; G01N 2009/022
See application file for complete search history.

(56) References Cited

U.S. PATENT DOCUMENTS

| | | | |
|---|---|---|---|
| 3,971,065 A | 7/1976 | Bayer | |
| 4,279,328 A | 7/1981 | Ahlbom | |
| 4,398,811 A | 8/1983 | Nishioka et al. | |
| 4,495,559 A | 1/1985 | Gelatt, Jr. | |
| 4,730,190 A | 3/1988 | Win et al. | |
| 4,803,639 A | 2/1989 | Steele et al. | |
| 5,220,536 A | 6/1993 | Stringer et al. | |
| 5,331,118 A | 7/1994 | Jensen | |

(Continued)

FOREIGN PATENT DOCUMENTS

| | | |
|---|---|---|
| AU | 2004212587 A1 | 4/2005 |
| DE | 3335760 A1 | 4/1985 |

(Continued)

OTHER PUBLICATIONS

Peter Clarke, Actuator Claims Anti-Shake Breakthrough for Smartphone Cams, Electronic Engineering Times, p. 24, May 16, 2011.

(Continued)

*Primary Examiner* — Michael P Stafira
(74) *Attorney, Agent, or Firm* — Additon, Higgins & Pendleton, P.A.

(57) ABSTRACT

A system and method for structured-light dimensioning is disclosed. The method includes combining multiple images using different camera settings to provide all of the information necessary dimensioning. What results is an improved ability to sense a light pattern reflected from an object's surfaces, especially when the lighting and/or object color make imaging all surfaces simultaneously difficult.

20 Claims, 2 Drawing Sheets

(56) References Cited

U.S. PATENT DOCUMENTS

| | | |
|---|---|---|
| 5,359,185 A | 10/1994 | Hanson |
| 5,384,901 A | 1/1995 | Glassner et al. |
| 5,548,707 A | 8/1996 | LoNegro |
| 5,555,090 A | 9/1996 | Schmutz |
| 5,590,060 A | 12/1996 | Granville et al. |
| 5,606,534 A | 2/1997 | Stringer et al. |
| 5,619,245 A | 4/1997 | Kessler et al. |
| 5,655,095 A | 8/1997 | LoNegro et al. |
| 5,661,561 A | 8/1997 | Wurz et al. |
| 5,699,161 A | 12/1997 | Woodworth |
| 5,729,750 A | 3/1998 | Ishida |
| 5,730,252 A | 3/1998 | Herbinet |
| 5,732,147 A | 3/1998 | Tao |
| 5,734,476 A | 3/1998 | Dlugos |
| 5,737,074 A | 4/1998 | Haga et al. |
| 5,767,962 A | 6/1998 | Suzuki et al. |
| 5,831,737 A | 11/1998 | Stringer et al. |
| 5,850,370 A | 12/1998 | Stringer et al. |
| 5,850,490 A | 12/1998 | Johnson |
| 5,869,827 A | 2/1999 | Rando |
| 5,870,220 A | 2/1999 | Migdal et al. |
| 5,900,611 A | 5/1999 | Hecht |
| 5,923,428 A | 7/1999 | Woodworth |
| 5,929,856 A | 7/1999 | LoNegro et al. |
| 5,938,710 A | 8/1999 | Lanza et al. |
| 5,959,568 A | 9/1999 | Woolley |
| 5,960,098 A | 9/1999 | Tao |
| 5,969,823 A | 10/1999 | Wurz et al. |
| 5,978,512 A | 11/1999 | Kim et al. |
| 5,979,760 A | 11/1999 | Freyman et al. |
| 5,988,862 A | 11/1999 | Kacyra et al. |
| 5,991,041 A | 11/1999 | Woodworth |
| 6,009,189 A | 12/1999 | Schaack |
| 6,025,847 A | 2/2000 | Marks |
| 6,049,386 A | 4/2000 | Stringer et al. |
| 6,053,409 A | 4/2000 | Brobst et al. |
| 6,064,759 A | 5/2000 | Buckley et al. |
| 6,067,110 A | 5/2000 | Nonaka et al. |
| 6,069,696 A | 5/2000 | McQueen et al. |
| 6,137,577 A | 10/2000 | Woodworth |
| 6,177,999 B1 | 1/2001 | Wurz et al. |
| 6,232,597 B1 | 5/2001 | Kley |
| 6,236,403 B1 | 5/2001 | Chaki |
| 6,246,468 B1 | 6/2001 | Dimsdale |
| 6,333,749 B1 | 12/2001 | Reinhardt et al. |
| 6,336,587 B1 | 1/2002 | He et al. |
| 6,369,401 B1 | 4/2002 | Lee |
| 6,373,579 B1 | 4/2002 | Ober et al. |
| 6,429,803 B1 | 8/2002 | Kumar |
| 6,457,642 B1 | 10/2002 | Good et al. |
| 6,507,406 B1 | 1/2003 | Yagi et al. |
| 6,517,004 B2 | 2/2003 | Good et al. |
| 6,519,550 B1 | 2/2003 | D'Hooge et al. |
| 6,674,904 B1 | 1/2004 | McQueen |
| 6,705,526 B1 | 3/2004 | Zhu et al. |
| 6,781,621 B1 | 8/2004 | Gobush et al. |
| 6,824,058 B2 | 11/2004 | Patel et al. |
| 6,858,857 B2 | 2/2005 | Pease et al. |
| 6,971,580 B2 | 12/2005 | Zhu et al. |
| 6,995,762 B1 | 2/2006 | Pavlidis et al. |
| 7,057,632 B2 | 6/2006 | Yamawaki et al. |
| 7,085,409 B2 | 8/2006 | Sawhney et al. |
| 7,086,162 B2 | 8/2006 | Tyroler |
| 7,104,453 B1 | 9/2006 | Zhu et al. |
| 7,137,556 B1 | 11/2006 | Bonner et al. |
| 7,161,688 B1 | 1/2007 | Bonner et al. |
| 7,214,954 B2 | 5/2007 | Schopp |
| 7,277,187 B2 | 10/2007 | Smith et al. |
| 7,307,653 B2 | 12/2007 | Dutta |
| 7,310,431 B2 | 12/2007 | Gokturk et al. |
| 7,527,205 B2 | 5/2009 | Zhu et al. |
| 7,586,049 B2 | 9/2009 | Wurz |
| 7,602,404 B1 | 10/2009 | Reinhardt et al. |
| 7,639,722 B1 | 12/2009 | Paxton et al. |
| 7,726,575 B2 | 6/2010 | Wang et al. |
| 7,780,084 B2 | 8/2010 | Zhang et al. |
| 7,788,883 B2 | 9/2010 | Buckley et al. |
| 7,974,025 B2 | 7/2011 | Topliss |
| 8,027,096 B2 | 9/2011 | Feng et al. |
| 8,028,501 B2 | 10/2011 | Buckley et al. |
| 8,050,461 B2 | 11/2011 | Shpunt et al. |
| 8,055,061 B2 | 11/2011 | Katano |
| 8,102,395 B2 | 1/2012 | Kondo et al. |
| 8,132,728 B2 | 3/2012 | Dwinell et al. |
| 8,134,717 B2 | 3/2012 | Pangrazio et al. |
| 8,149,224 B1 | 4/2012 | Kuo et al. |
| 8,194,097 B2 | 6/2012 | Xiao et al. |
| 8,212,889 B2 | 7/2012 | Chanas et al. |
| 8,228,510 B2 | 7/2012 | Pangrazio et al. |
| 8,230,367 B2 | 7/2012 | Bell et al. |
| 8,305,458 B2 | 11/2012 | Hara |
| 8,310,656 B2 | 11/2012 | Zalewski |
| 8,313,380 B2 | 11/2012 | Zalewski et al. |
| 8,339,462 B2 | 12/2012 | Stec et al. |
| 8,350,959 B2 | 1/2013 | Topliss et al. |
| 8,351,670 B2 | 1/2013 | Ijiri et al. |
| 8,381,976 B2 | 2/2013 | Mohideen et al. |
| 8,437,539 B2 | 5/2013 | Komatsu et al. |
| 8,441,749 B2 | 5/2013 | Brown et al. |
| 8,463,079 B2 | 6/2013 | Ackley et al. |
| 8,570,343 B2 | 10/2013 | Halstead |
| 8,576,390 B1 | 11/2013 | Nunnink |
| 8,773,507 B2 * | 7/2014 | Gharib ............... G02B 7/34 348/46 |
| 8,792,688 B2 | 7/2014 | Unsworth |
| 8,810,779 B1 | 8/2014 | Hilde |
| 8,897,596 B1 | 11/2014 | Passmore et al. |
| 9,014,441 B2 | 4/2015 | Truyen et al. |
| 9,082,195 B2 | 7/2015 | Holeva et al. |
| 9,142,035 B1 | 9/2015 | Rotman et al. |
| 9,233,470 B1 | 1/2016 | Bradski et al. |
| 9,247,235 B2 * | 1/2016 | Gharib ............... G01B 11/002 |
| 9,299,013 B1 | 3/2016 | Curlander et al. |
| 9,424,749 B1 | 8/2016 | Reed et al. |
| 9,486,921 B1 | 11/2016 | Straszheim et al. |
| 2001/0027995 A1 | 10/2001 | Patel et al. |
| 2001/0032879 A1 | 10/2001 | He et al. |
| 2002/0054289 A1 | 5/2002 | Thibault et al. |
| 2002/0067855 A1 | 6/2002 | Chiu et al. |
| 2002/0109835 A1 | 8/2002 | Goetz |
| 2002/0118874 A1 | 8/2002 | Chung et al. |
| 2002/0158873 A1 | 10/2002 | Williamson |
| 2002/0167677 A1 | 11/2002 | Okada et al. |
| 2002/0179708 A1 | 12/2002 | Zhu et al. |
| 2002/0196534 A1 | 12/2002 | Lizotte et al. |
| 2003/0038179 A1 | 2/2003 | Tsikos et al. |
| 2003/0053513 A1 | 3/2003 | Vatan et al. |
| 2003/0063086 A1 | 4/2003 | Baumberg |
| 2003/0091227 A1 | 5/2003 | Chang et al. |
| 2003/0156756 A1 | 8/2003 | Gokturk et al. |
| 2003/0197138 A1 | 10/2003 | Pease et al. |
| 2003/0225712 A1 | 12/2003 | Cooper et al. |
| 2003/0235331 A1 | 12/2003 | Kawaike et al. |
| 2004/0008259 A1 | 1/2004 | Gokturk et al. |
| 2004/0019274 A1 | 1/2004 | Galloway et al. |
| 2004/0024754 A1 | 2/2004 | Mane et al. |
| 2004/0066329 A1 | 4/2004 | Zeitfuss et al. |
| 2004/0073359 A1 | 4/2004 | Ichijo et al. |
| 2004/0083025 A1 | 4/2004 | Yamanouchi et al. |
| 2004/0089482 A1 | 5/2004 | Ramsden et al. |
| 2004/0098146 A1 | 5/2004 | Katae et al. |
| 2004/0105580 A1 | 6/2004 | Hager et al. |
| 2004/0118928 A1 | 6/2004 | Patel et al. |
| 2004/0155975 A1 | 8/2004 | Hart et al. |
| 2004/0165090 A1 | 8/2004 | Ning |
| 2004/0184041 A1 | 9/2004 | Schopp |
| 2004/0211836 A1 | 10/2004 | Patel et al. |
| 2004/0214623 A1 | 10/2004 | Takahashi et al. |
| 2004/0233461 A1 | 11/2004 | Armstrong et al. |
| 2004/0258353 A1 | 12/2004 | Gluckstad et al. |
| 2005/0006477 A1 | 1/2005 | Patel |
| 2005/0117215 A1 | 6/2005 | Lange |
| 2005/0128196 A1 | 6/2005 | Popescu et al. |
| 2005/0168488 A1 | 8/2005 | Montague |

(56) References Cited

U.S. PATENT DOCUMENTS

| | | |
|---|---|---|
| 2005/0211782 A1 | 9/2005 | Martin |
| 2005/0264867 A1 | 12/2005 | Cho et al. |
| 2006/0047704 A1 | 3/2006 | Gopalakrishnan |
| 2006/0078226 A1 | 4/2006 | Zhou |
| 2006/0108266 A1 | 5/2006 | Bowers et al. |
| 2006/0112023 A1 | 5/2006 | Horhann |
| 2006/0151604 A1 | 7/2006 | Zhu et al. |
| 2006/0159307 A1 | 7/2006 | Anderson et al. |
| 2006/0159344 A1 | 7/2006 | Shao et al. |
| 2006/0232681 A1 | 10/2006 | Okada |
| 2006/0255150 A1 | 11/2006 | Longacre |
| 2006/0269165 A1 | 11/2006 | Viswanathan |
| 2006/0291719 A1 | 12/2006 | Ikeda et al. |
| 2007/0003154 A1 | 1/2007 | Sun et al. |
| 2007/0025612 A1 | 2/2007 | Iwasaki et al. |
| 2007/0031064 A1 | 2/2007 | Zhao et al. |
| 2007/0116357 A1 | 5/2007 | Dewaele |
| 2007/0127022 A1 | 6/2007 | Cohen et al. |
| 2007/0143082 A1 | 6/2007 | Degnan |
| 2007/0153293 A1 | 7/2007 | Gruhlke et al. |
| 2007/0171220 A1 | 7/2007 | Kriveshko |
| 2007/0177011 A1 | 8/2007 | Lewin et al. |
| 2007/0181685 A1 | 8/2007 | Zhu et al. |
| 2007/0237356 A1 | 10/2007 | Dwinell et al. |
| 2007/0291031 A1 | 12/2007 | Konev et al. |
| 2007/0299338 A1 | 12/2007 | Stevick et al. |
| 2008/0013793 A1 | 1/2008 | Hillis et al. |
| 2008/0035390 A1 | 2/2008 | Wurz |
| 2008/0056536 A1 | 3/2008 | Hildreth et al. |
| 2008/0062164 A1 | 3/2008 | Bassi et al. |
| 2008/0077265 A1 | 3/2008 | Boyden |
| 2008/0164074 A1 | 7/2008 | Wurz |
| 2008/0204476 A1 | 8/2008 | Montague |
| 2008/0212168 A1 | 9/2008 | Olmstead et al. |
| 2008/0247635 A1 | 10/2008 | Davis et al. |
| 2008/0273191 A1 | 11/2008 | Kim et al. |
| 2008/0278790 A1 | 11/2008 | Boesser et al. |
| 2009/0059004 A1 | 3/2009 | Bochicchio |
| 2009/0095047 A1 | 4/2009 | Patel et al. |
| 2009/0225333 A1 | 9/2009 | Bendall et al. |
| 2009/0237411 A1 | 9/2009 | Gossweiler et al. |
| 2009/0268023 A1 | 10/2009 | Hsieh |
| 2009/0272724 A1 | 11/2009 | Gubler |
| 2009/0273770 A1 | 11/2009 | Bauhahn et al. |
| 2009/0313948 A1 | 12/2009 | Buckley et al. |
| 2009/0323084 A1 | 12/2009 | Dunn et al. |
| 2009/0323121 A1 | 12/2009 | Valkenburg |
| 2010/0035637 A1 | 2/2010 | Varanasi et al. |
| 2010/0060604 A1 | 3/2010 | Zwart et al. |
| 2010/0091104 A1 | 4/2010 | Sprigle |
| 2010/0118200 A1 | 5/2010 | Gelman et al. |
| 2010/0128109 A1 | 5/2010 | Banks |
| 2010/0161170 A1 | 6/2010 | Siris |
| 2010/0171740 A1 | 7/2010 | Andersen et al. |
| 2010/0172567 A1 | 7/2010 | Prokoski |
| 2010/0202702 A1 | 8/2010 | Benos et al. |
| 2010/0208039 A1 | 8/2010 | Stettner |
| 2010/0211355 A1 | 8/2010 | Horst et al. |
| 2010/0217678 A1 | 8/2010 | Goncalves |
| 2010/0220849 A1 | 9/2010 | Colbert et al. |
| 2010/0220894 A1 | 9/2010 | Ackley et al. |
| 2010/0223276 A1 | 9/2010 | Al-Shameri et al. |
| 2010/0254611 A1 | 10/2010 | Arnz |
| 2010/0303336 A1 | 12/2010 | Abraham |
| 2010/0315413 A1 | 12/2010 | Izadi et al. |
| 2011/0019155 A1 | 1/2011 | Daniel et al. |
| 2011/0040192 A1 | 2/2011 | Brenner et al. |
| 2011/0043609 A1 | 2/2011 | Choi et al. |
| 2011/0099474 A1 | 4/2011 | Grossman et al. |
| 2011/0188054 A1 | 8/2011 | Petronius et al. |
| 2011/0234389 A1 | 9/2011 | Mellin |
| 2011/0235854 A1 | 9/2011 | Berger et al. |
| 2011/0249864 A1 | 10/2011 | Venkatesan et al. |
| 2011/0254840 A1 | 10/2011 | Halstead |
| 2011/0279916 A1 | 11/2011 | Brown et al. |
| 2011/0286007 A1 | 11/2011 | Pangrazio et al. |
| 2011/0286628 A1 | 11/2011 | Goncalves et al. |
| 2011/0288818 A1 | 11/2011 | Thierman |
| 2011/0301994 A1 | 12/2011 | Tieman |
| 2011/0303748 A1 | 12/2011 | Lemma et al. |
| 2011/0310227 A1 | 12/2011 | Konertz et al. |
| 2012/0024952 A1 | 2/2012 | Chen |
| 2012/0056982 A1 | 3/2012 | Katz et al. |
| 2012/0057345 A1 | 3/2012 | Kuchibhotla |
| 2012/0067955 A1 | 3/2012 | Rowe |
| 2012/0074227 A1 | 3/2012 | Ferren et al. |
| 2012/0081714 A1 | 4/2012 | Pangrazio et al. |
| 2012/0113223 A1 | 5/2012 | Hilliges et al. |
| 2012/0113250 A1 | 5/2012 | Farlotti et al. |
| 2012/0126000 A1 | 5/2012 | Kunzig et al. |
| 2012/0140300 A1 | 6/2012 | Freeman |
| 2012/0179665 A1 | 7/2012 | Baarman et al. |
| 2012/0185094 A1 | 7/2012 | Rosenstein et al. |
| 2012/0190386 A1 | 7/2012 | Anderson |
| 2012/0197464 A1 | 8/2012 | Wang et al. |
| 2012/0218436 A1 | 8/2012 | Rodriguez et al. |
| 2012/0224026 A1 | 9/2012 | Bayer et al. |
| 2012/0236288 A1 | 9/2012 | Stanley |
| 2012/0242852 A1 | 9/2012 | Hayward et al. |
| 2012/0256901 A1 | 10/2012 | Bendall |
| 2012/0262558 A1 | 10/2012 | Boger et al. |
| 2012/0280908 A1 | 11/2012 | Rhoads et al. |
| 2012/0282905 A1 | 11/2012 | Owen |
| 2012/0282911 A1 | 11/2012 | Davis et al. |
| 2012/0284012 A1 | 11/2012 | Rodriguez et al. |
| 2012/0284122 A1 | 11/2012 | Brandis |
| 2012/0284339 A1 | 11/2012 | Rodriguez |
| 2012/0284593 A1 | 11/2012 | Rodriguez |
| 2012/0293610 A1 | 11/2012 | Doepke et al. |
| 2012/0294549 A1 | 11/2012 | Doepke |
| 2012/0299961 A1 | 11/2012 | Ramkumar et al. |
| 2012/0300991 A1 | 11/2012 | Free |
| 2012/0313848 A1 | 12/2012 | Galor et al. |
| 2012/0314030 A1 | 12/2012 | Datta |
| 2012/0314058 A1 | 12/2012 | Bendall et al. |
| 2012/0316820 A1 | 12/2012 | Nakazato et al. |
| 2013/0038881 A1 | 2/2013 | Pesach et al. |
| 2013/0038941 A1 | 2/2013 | Pesach et al. |
| 2013/0050426 A1 | 2/2013 | Sarmast et al. |
| 2013/0094069 A1 | 4/2013 | Lee et al. |
| 2013/0101158 A1 | 4/2013 | Lloyd et al. |
| 2013/0200150 A1 | 8/2013 | Reynolds et al. |
| 2013/0201288 A1 | 8/2013 | Billerbeck et al. |
| 2013/0208164 A1 | 8/2013 | Cazier et al. |
| 2013/0211790 A1 | 8/2013 | Loveland et al. |
| 2013/0223673 A1 | 8/2013 | Davis et al. |
| 2013/0291998 A1 | 11/2013 | Konnerth |
| 2013/0293539 A1 | 11/2013 | Hunt et al. |
| 2013/0293540 A1 | 11/2013 | Laffargue et al. |
| 2013/0307964 A1 | 11/2013 | Bremer et al. |
| 2013/0308013 A1 | 11/2013 | Li et al. |
| 2013/0329012 A1 | 12/2013 | Bartos |
| 2013/0329013 A1 | 12/2013 | Metois et al. |
| 2013/0342343 A1 | 12/2013 | Harring et al. |
| 2014/0002828 A1 | 1/2014 | Laffargue et al. |
| 2014/0021259 A1* | 1/2014 | Moed ............... G06K 9/2027 235/472.01 |
| 2014/0031665 A1 | 1/2014 | Pinto et al. |
| 2014/0034731 A1 | 2/2014 | Gao et al. |
| 2014/0049635 A1 | 2/2014 | Laffargue et al. |
| 2014/0058612 A1 | 2/2014 | Wong et al. |
| 2014/0067104 A1 | 3/2014 | Osterhout |
| 2014/0091147 A1 | 4/2014 | Evans et al. |
| 2014/0097238 A1 | 4/2014 | Ghazizadeh |
| 2014/0098091 A1 | 4/2014 | Hori |
| 2014/0100813 A1 | 4/2014 | Showering |
| 2014/0104413 A1 | 4/2014 | Mccloskey et al. |
| 2014/0104414 A1 | 4/2014 | McCloskey et al. |
| 2014/0104416 A1* | 4/2014 | Giordano ............... G01B 11/02 348/135 |
| 2014/0104664 A1 | 4/2014 | Lee |
| 2014/0135984 A1 | 5/2014 | Hirata |
| 2014/0139654 A1 | 5/2014 | Takahashi |
| 2014/0152975 A1 | 6/2014 | Ko |

(56) References Cited

U.S. PATENT DOCUMENTS

| | | |
|---|---|---|
| 2014/0158468 A1 | 6/2014 | Adami |
| 2014/0168380 A1 | 6/2014 | Heidemann et al. |
| 2014/0192187 A1* | 7/2014 | Atwell .................. G01B 11/25 348/136 |
| 2014/0192551 A1 | 7/2014 | Masaki |
| 2014/0205150 A1 | 7/2014 | Ogawa |
| 2014/0225918 A1 | 8/2014 | Mittal et al. |
| 2014/0225985 A1 | 8/2014 | Klusza et al. |
| 2014/0240464 A1 | 8/2014 | Lee |
| 2014/0247279 A1 | 9/2014 | Nicholas et al. |
| 2014/0247280 A1 | 9/2014 | Nicholas et al. |
| 2014/0267609 A1 | 9/2014 | Laffargue |
| 2014/0268093 A1 | 9/2014 | Tohme et al. |
| 2014/0270361 A1 | 9/2014 | Amma et al. |
| 2014/0306833 A1 | 10/2014 | Ricci |
| 2014/0307855 A1 | 10/2014 | Withagen et al. |
| 2014/0313527 A1 | 10/2014 | Askan |
| 2014/0319219 A1 | 10/2014 | Liu et al. |
| 2014/0320408 A1 | 10/2014 | Zagorsek et al. |
| 2014/0347553 A1 | 11/2014 | Ovsiannikov et al. |
| 2014/0350710 A1 | 11/2014 | Gopalkrishnan et al. |
| 2014/0379613 A1 | 12/2014 | Nishitani et al. |
| 2015/0009301 A1 | 1/2015 | Ribnick et al. |
| 2015/0009338 A1 | 1/2015 | Laffargue et al. |
| 2015/0036876 A1 | 2/2015 | Marrion et al. |
| 2015/0049347 A1 | 2/2015 | Laffargue et al. |
| 2015/0062369 A1 | 3/2015 | Gehring et al. |
| 2015/0063676 A1 | 3/2015 | Lloyd et al. |
| 2015/0116498 A1 | 4/2015 | Vartiainen et al. |
| 2015/0149946 A1 | 5/2015 | Benos et al. |
| 2015/0163474 A1 | 6/2015 | You |
| 2015/0204662 A1 | 7/2015 | Kobayashi et al. |
| 2015/0213647 A1 | 7/2015 | Laffargue et al. |
| 2015/0229838 A1 | 8/2015 | Hakim et al. |
| 2015/0269403 A1 | 9/2015 | Lei et al. |
| 2015/0276379 A1 | 10/2015 | Ni et al. |
| 2015/0301181 A1 | 10/2015 | Herschbach |
| 2015/0308816 A1 | 10/2015 | Laffargue et al. |
| 2015/0325036 A1 | 11/2015 | Lee |
| 2015/0355470 A1 | 12/2015 | Herschbach |
| 2016/0048725 A1 | 2/2016 | Holz et al. |
| 2016/0063429 A1 | 3/2016 | Varley et al. |
| 2016/0090283 A1 | 3/2016 | Svensson et al. |
| 2016/0090284 A1 | 3/2016 | Svensson et al. |
| 2016/0138247 A1 | 5/2016 | Conway et al. |
| 2016/0138248 A1 | 5/2016 | Conway et al. |
| 2016/0138249 A1 | 5/2016 | Svensson et al. |
| 2016/0169665 A1 | 6/2016 | Deschenes et al. |
| 2016/0187186 A1 | 6/2016 | Coleman et al. |
| 2016/0187210 A1 | 6/2016 | Coleman et al. |
| 2016/0191801 A1 | 6/2016 | Sivan |
| 2016/0202478 A1 | 7/2016 | Masson et al. |
| 2017/0115490 A1 | 4/2017 | Hsieh et al. |

FOREIGN PATENT DOCUMENTS

| | | |
|---|---|---|
| DE | 10210813 A1 | 10/2003 |
| DE | 102007037282 A1 | 3/2008 |
| EP | 1111435 A2 | 6/2001 |
| EP | 1443312 A1 | 8/2004 |
| EP | 2286932 A2 | 2/2011 |
| EP | 2381421 A2 | 10/2011 |
| EP | 2533009 A2 | 12/2012 |
| EP | 2722656 A1 | 4/2014 |
| EP | 2779027 A1 | 9/2014 |
| EP | 2833323 A2 | 2/2015 |
| EP | 2843590 A1 | 3/2015 |
| EP | 2845170 A1 | 3/2015 |
| EP | 2966595 A1 | 1/2016 |
| EP | 3006893 A1 | 3/2016 |
| EP | 3012601 A1 | 3/2016 |
| EP | 3007096 A1 | 4/2016 |
| GB | 2503978 A | 1/2014 |
| GB | 2531928 A | 5/2016 |
| JP | H04129902 A | 4/1992 |
| JP | 2008210276 A | 9/2008 |
| JP | 2014210646 A | 11/2014 |
| KR | 20110013200 A | 2/2011 |
| KR | 20110117020 A | 10/2011 |
| KR | 20120028109 A | 3/2012 |
| WO | 96/40452 A1 | 1/1996 |
| WO | 0077726 A1 | 12/2000 |
| WO | 0114836 A1 | 3/2001 |
| WO | 2006095110 A1 | 9/2006 |
| WO | 2007015059 A1 | 2/2007 |
| WO | 2011017241 A1 | 2/2011 |
| WO | 2012175731 A1 | 12/2012 |
| WO | 2013021157 A1 | 2/2013 |
| WO | 2013033442 A1 | 3/2013 |
| WO | 2013166368 A1 | 11/2013 |
| WO | 2013184340 A1 | 12/2013 |
| WO | 2014102341 A1 | 7/2014 |
| WO | 2014149702 A1 | 9/2014 |
| WO | 2014151746 A2 | 9/2014 |
| WO | 2015006865 A1 | 1/2015 |
| WO | 2016020038 A1 | 2/2016 |
| WO | 2016061699 A1 | 4/2016 |

OTHER PUBLICATIONS

U.S. Appl. No. 14/055,234, not yet published, Hand Held Products, Inc. filed Oct. 16, 2013; 26 pages.
U.S. Appl. No. 13/912,262, not yet published, filed Jun. 7, 2013, Hand Held Products Inc., Method of Error Correction Application for 3D Imaging Device: 33 pages.
European Search Report for application No. EP13186043 (now EP2722656 (Apr. 23, 2014)): Total pp. 7.
International Search Report for PCT/US2013/039438 (WO2013166368), Oct. 1, 2013, 7 pages.
U.S. Appl. No. 14/453,019, not yet published, filed Aug. 6, 2014, Hand Held Products Inc., Dimensioning System With Guided Alignment: 31 pages.
European Office Action for application EP 13186043, dated Jun. 12, 2014(now EP2722656 (Apr. 23, 2014)), Total of 6 pages.
U.S. Appl. No. 14/461,524, not yet published, filed Aug. 18, 2014, Hand Held Products Inc., System and Method for Package Dimensioning: 21 pages.
U.S. Appl. No. 14/490,989, not yet published, filed Sep. 19, 2014, Intermec IP Corporation, Volume Dimensioning System Calibration Systems and Methods.
Wikipedia, YUV description and definition, downloaded from http://www.wikipeida.org/wiki/YUV on Jun. 29, 2012, 10 pages.
YUV Pixel Format, downloaded from http://www.fource.org/yuv.php on Jun. 29, 2012; 13 pages.
YUV to RGB Conversion, downloaded from http://www.fource.org/fccyvrgb.php on Jun. 29, 2012; 5 pages.
Benos et al., "Semi-Automatic Dimensioning with Imager of a Portable Device," U.S. Appl. No. 61/149,912, filed Feb. 4, 2009 (now expired), 56 pages.
Dimensional Weight—Wikipedia, the Free Encyclopedia, URL=http://en.wikipedia.org/wiki/Dimensional_weight, download date Aug. 1, 2008, 2 pages.
Dimensioning—Wikipedia, the Free Encyclopedia, URL=http://en.wikipedia.org/wiki/Dimensioning, download date Aug. 1, 2008, 1 page.
United Kingdom Search Report in related application GB1517842.9, dated Apr. 8, 2016, 8 pages.
European Search Report for related EP Application No. 15188440.0, dated Mar. 8, 2016, 8 pages.
European Search Report in related EP Application No. 15190315.0, dated Apr. 1, 2016, 7 pages [Commonly owned Reference 2014/0104416 has been previously cited].
Second Chinese Office Action in related CN Application No. 2015220810562.2, dated Mar. 22, 2016, 5 pages. English Translation provided [No references].
European Search Report for related Application EP 15190249.1, dated Mar. 22, 2016, 7 pages.

(56) References Cited

OTHER PUBLICATIONS

Search Report and Opinion in related GB Application No. 1517112. 7, dated Feb. 19, 2016, 6 Pages (GB2503978 is commonly owned now abandoned application and not cited above).
Lloyd, Ryan and Scott McCloskey, "Recognition of 3D Package Shapes for Singe Camera Metrology" IEEE Winter conference on Applications of computer Visiona, IEEE, Mar. 24, 2014, pp. 99-106, {retrieved on Jun. 16, 2014}, Authors are employees of common Applicant.
European Search Report for Related EP Application No. 15189214. 8, dated Mar. 3, 2016, 9 pages.
Second Chinese Office Action in related CN Application No. 201520810685.6, dated Mar. 22, 2016, 5 pages, No references.
Search Report and Opinion in Related EP Application 15176943.7, dated Jan. 8, 2016, 8 pages, (U.S. Application 2014/0049635 has been previously cited).
European Patent Office Action for Application No. 14157971.4-1906, dated Jul. 16, 2014, 5 pages.
European Patent Search Report for Application No. 14157971.4-1906, dated Jun. 30, 2014, 6 pages.
Caulier, Yannick et al., "A New Type of Color-Coded Light Structures for an Adapted and Rapid Determination of Point Correspondences for 3D Reconstruction." Proc. of SPIE, vol. 8082 808232-3; 2011; 8 pages.
Kazantsev, Aleksei et al. "Robust Pseudo-Random Coded Colored STructured Light Techniques for 3D Object Model Recovery"; ROSE 2008 IEEE International Workshop on Robotic and Sensors Environments (Oct. 17-18, 2008), 6 pages.
Mouaddib E. et al. "Recent Progress in Structured Light in order to Solve the Correspondence Problem in Stereo Vision" Proceedings of the 1997 IEEE International Conference on Robotics and Automation, Apr. 1997; 7 pages.
Proesmans, Marc et al. "Active Acquisition of 3D Shape for Moving Objects" 0-7803-3258-X/96 1996 IEEE; 4 pages.
Salvi, Joaquim et al. "Pattern Codification Strategies in Structured Light Systems" published in Pattern Recognition; The Journal of the Pattern Recognition Society, Received Mar. 6, 2003; Accepted Oct. 2, 2003; 23 pages.
U.S. Appl. No. 14/800,757, Eric Todeschini, filed Jul. 16, 2015, not published yet, Dimensioning and Imaging Items, 80 pages.
U.S. Appl. No. 14/747,197, Serge Thuries et al., filed Jun. 23, 2015, not published yet, Optical Pattern PROJECTOR; 33 pages.
U.S. Appl. No. 14/747,490, Brian L. Jovanovski et al., filed Jun. 23, 2015, not published yet, Dual-PROJECTOR Three-Dimensional Scanner; 40 pages.
U.S. Appl. No. 14/715,916, H. Sprague Ackley, filed May 9, 2015, not published yet, Evaluating Image Values; 54 pages.
U.S. Appl. No. 14/793,149, H. Sprague Ackley, filed Jul. 7, 2015, not published yet, Mobile Dimensioner Apparatus for Use in Commerce; 57 pages.
U.S. Appl. No. 14/740,373, H. Sprague Ackley et al., filed Jun. 16, 2015, not published yet, Calibrating A Volume Dimensioner; 63 pages.
U.S. Appl. No. 14/801,023, Tyler Doomenbal et al., filed Jul. 16, 2015, not published yet, Adjusting Dimensioning Results Using Augmented Reality, 39 pages.
Leotta, Matthew, Generic, Deformable Models for 3-D Vehicle Surveillance, May 2010, Doctoral Dissertation, Brown University, Providence RI, 248 pages.
Ward, Benjamin, Interactive 3D Reconstruction from Video, Aug. 2012, Doctoral Thesis, Univesity of Adelaide, Adelaide, South Australia, 157 pages.
Hood, Frederick W.; William A. Hoff, Robert King, Evaluation of an Interactive Technique for Creating Site Models from Range Data, Apr. 27-May1, 1997 Proceedings of the ANS 7th Topical Meeting on Robotics & Remote Systems, Augusta GA, 9 pages.
Gupta, Alok; Range Image Segmentation for 3-D Objects Recognition, May 1988, Technical Reports (CIS), Paper 736, University of Pennsylvania Department of Computer and Information Science, retrieved from Http://repository.upenn. edu/cis_reports/736, Accessed May 31, 2015, 157 pages.
Reisner-Kollmann, Irene; Anton L. Fuhrmann, Werner Purgathofer, Interactive Reconstruction of Industrial Sites Using Parametric Models, May 2010, Proceedings of the 26th Spring Conference of Computer Graphics SCCG "10, 8 pages.
Drummond, Tom; Roberto Cipolla, Real-Time Visual Tracking of Complex Structures, Jul. 2002, IEEE Transactions on Pattern Analysis and Machine Intelligence, vol. 24, No. 7; 15 pages.
Zhang, Zhaoxiang; Tieniu Tan, Kaiqi Huang, Yunhong Wang; Three-Dimensional Deformable-Model-based Localization and Recognition of Road Vehicles; IEEE Transactions on Image Processing, vol. 21, No. 1, Jan. 2012, 13 pages.
Leotta, Matthew J.; Joseph L. Mundy; Predicting High Resolution Image Edges with a Generic, Adaptive, 3-D Vehicle Model; IEEE Conference on Computer Vision and Pattern Recognition, 2009; 8 pages.
Spiller, Jonathan; Object Localization Using Deformable Templates, Master's Dissertation, University of the Witwatersrand, Johannesburg, South Africa, 2007; 74 pages.
EP Search and Written Opinion Report in related matter EP Application No. 14181437.6, dated Mar. 26, 2015, 7 pages.
Hetzel, Gunter et al.; "3D Object Recognition from Range Images using Local Feature Histograms,", Proceedings 2001 IEEE Conference on Computer Vision and Pattern Recognition. CVPR 2001. Kauai, Hawaii, Dec. 8- 14, 2001; pp. 394-399, XP010584149, ISBN: 978-0-7695-1272-3.
Intention to Grant in counterpart European Application No. 14157971.4 dated Apr. 14, 2015, pp. 1-8.
Decision to Grant in counterpart European Application No. 14157971.4 dated Aug. 6, 2015, pp. 1-2.
Office Action in counterpart European Application No. 13186043.9 dated Sep. 30, 2015, pp. 1-7.
Lloyd et al., "System for Monitoring the Condition of Packages Throughout Transit", U.S. Appl. No. 14/865,575, filed Sep. 25, 2015, 59 pages, not yet published.
James Chamberlin, "System and Method for Picking Validation", U.S. Appl. No. 14/865,797, filed Sep. 25, 2015, 44 pages, not yet published.
Jovanovski et al., "Image-Stitching for Dimensioning", U.S. Appl. No. 14/870,488, filed Sep. 30, 2015, 45 pages, not yet published.
Todeschini et al.; "Depth Sensor Based Auto-Focus System for an Indicia Scanner," U.S. Appl. No. 14/872,176, filed Oct. 1, 2015, 44 pages, not yet published.
Wikipedia, "3D projection" Downloaded on Nov. 25, 2015 from www.wikipedia.com, 4 pages.
McCloskey et al., "Methods for Improving the Accuracy of Dimensioning-System Measurements," U.S. Appl. No. 14/873,613, filed Sep. 2, 2015, 47 pages, not yet published.
Search Report in counterpart European Application No. 15182675. 7, dated Dec. 4, 2015, 10 pages.
McCloskey et al., "Image Transformation for Indicia Reading," U.S. Appl. No. 14/982,032, filed Oct. 30, 2015, 48 pages, not yet published.
Second Chinese Office Action in related CN Application No. 201520810313.3, dated Mar. 22, 2016, 5 pages. English Translation provided [No references].
Great Britain Search Report for related Application On. GB1517843.7, dated Feb. 23, 2016; 8 pages.
European Partial Search Report for related EP Application No. 15190306.9, dated May 6, 2016, 8 pages.
Mike Stensvold, "get the Most Out of Variable Aperture Lenses", published on www.OutdoorPhotogrpaher.com; dated Dec. 7, 2010; 4 pages, [As noted on search report retrieved from URL: http://www.outdoorphotographer.com/gear/lenses/get-the-most-out-ofvariable-aperture-lenses.html on Feb. 9, 2016].
European extended Search report in related EP Application 13785171.3, dated Sep. 19, 2016, 8 pages.
El-Hakim et al., "Multicamera vision-based approach to flexible feature measurement for inspection and reverse engineering", published in Optical Engineering, Society of Photo-Optical Instrumentation Engineers, vol. 32, No. 9, Sep. 1, 1993, 15 pages.

(56) References Cited

OTHER PUBLICATIONS

El-Hakim et al., "A Knowledge-based Edge/Object Measurement Technique", Retrieved from the Internet: URL: https://www.researchgate.net/profile/Sabry_El -Hakim/publication/44075058_A_Knowledge_Based_EdgeObject_Measurement_Technique/links/00b4953b5faa7d3304000000.pdf [retrieved on Jul. 15, 2016] dated Jan. 1, 1993, 9 pages.
European Extended search report in related EP Application No. 15190306.9, dated Sep. 9, 2016, 15 pages [only new references are cited; remaining references were cited with partial search report in same application dated May 6, 2016].
Collings et al., "The Applications and Technology of Phase-Only Liquid Crystal on Silicon Devices", Journal of Display Technology, IEEE Service Center, New, York, NY, US, vol. 7, No. 3, Mar. 1, 2011 (Mar. 1, 2011), pp. 112-119.
European Extended Search Report in Related EP Application No. 16172995.9, dated Aug. 22, 2016, 11 pages (Only new references have been cited; U.S. Pat. No. 8,463,079 (formerly U.S. Publication 201010220894) and U.S. Publication 2001/0027955 have been previously cited.).
European Search Report from related EP Application No. 16168216.6, dated Oct. 20, 2016, 8 pages. [New reference cited above; U.S. Publication 2014/0104413 has been previously cited].
European Search Report for related EP Application No. 16152477.2, dated May 24, 2016, 8 pages [New Reference cited herein; Reference DE102007037282 A1 and its U.S. Counterparts have been previously cited.].
United Kingdom combined Search and Examination Report in related GB Application No. 1607394.2, dated Oct. 19, 2016, 7 pages.
M. Zahid Gurbuz, Selim Akyokus, Ibrahim Emiroglu, Aysun Guran, An Efficient Algorithm for 3D Rectangular Box Packing, 2009, Applied Automatic Systems: Proceedings of Selected AAS 2009 Papers, pp. 131-134 [Examiner cited art in related U.S. matter with Notice of Allowance dated Aug. 11, 2016].
Padzensky, Ron; "Augmera; Gesture Control", Dated Apr. 18, 2015, 15 pages [Examiner Cited Art in Office Action dated Jan. 20, 2017 in related Application.].
Grabowski, Ralph; "New Commands in AutoCADS 2010: Part 11 Smoothing 3D Mesh Objects" Dated 2011 (per examiner who cited reference), 6 pages, [Examiner Cited Art in Office Action dated Jan. 20, 2017 in related Application.].
Theodoropoulos, Gabriel; "Using Gesture Recognizers to Handle Pinch, Rotate, Pan, Swipe, and Tap Gestures" dated Aug. 25, 2014, 34 pages, [Examiner Cited Art in Office Action dated Jan. 20, 2017 in related Application.].
European Extended Search Report in related EP Application No. 16190017.0, dated Jan. 4, 2017, 6 pages.
European Extended Search Report in related EP Application No. 16173429.8, dated Dec. 1, 2016, 8 pages [Only new references cited: U.S. 2013/0038881 was previously cited].
Extended European Search Report in related EP Application No. 16175410.0, dated Dec. 13, 2016, 5 pages.
Wikipedia, "Microlens", Downloaded from https://en.wikipedia.org/wiki/Microlens, pp. 3. {Cited by Examiner in Feb. 9, 2017 Final Office Action in related matter}.
Fukaya et al., "Characteristics of Speckle Random Pattern and Its Applications", pp. 317-327, Nouv. Rev. Optique, t. 6, n. 6. (1975) {Cited by Examiner in Feb. 9, 2017 Final Office Action in related matter: downloaded Mar. 2, 2017 from http://iopscience.iop.org}.
European Examination report in related EP Application No. 14181437.6, dated Feb. 8, 2017, 5 pages [References have been previously cited].
European extended search report in related EP Application 16190833.0, dated Mar. 9, 2017, 8 pages [only new art has been cited; U.S. Publication 2014/0034731 was previously cited].
United Kingdom Combined Search and Examination Report in related Application No. GB1620676.5, dated Mar. 8, 2017, 6 pages [References have been previously cited; WO2014/151746, WO2012/175731, U.S. 2014/0313527, GB2503978].
European Exam Report in related, EP Application No. 16168216.6, dated Feb. 27, 2017, 5 pages, [References lave been previously cited; WO2011/017241 and U.S. 2014/0104413].
Thorlabs, Examiner Cited NPL in Advisory Action dated Apr. 12, 2017 in related commonly owned application, downloaded from https://www.thorlabs.com/newgrouppage9.cfm?objectgroup_id=6430, 4 pages.
EKSMA Optics, Examiner Cited NPL in Advisory Action dated Apr. 12, 2017 in related commonly owned application, downloaded from http://eksmaoptics.com/optical-systems/f-theta-lenses/f-theta-lens-for-1064-nm/, 2 pages.
Still Optics, Examiner Cited NPL in Advisory Action dated Apr. 12, 2017 in related commonly owned application, http://www.silloptics.de/1/products/sill-encyclopedia/laser-optics/f-theta-lenses/, 4 pages.
Chinese Notice of Reexamination in related Chinese Application 201520810313.3, dated Mar. 14, 2017, English computer Translation provided, 7 pages [No new art cited].
Extended European search report in related EP Application 16199707.7, dated Apr. 10, 2017, 15 pages.
Ulusoy et al., One-Shot Scanning using De Bruijn Spaced Grids, 2009 IEEE 12th International Conference on computer Vision Workshops, ICCV Workshops, 7 pages [Cited in EP Extended search report dated Apr. 10, 2017].
European Exam Report in related EP Application No. 15176943.7, dated Apr. 12, 2017, 6 pages [Art previously cited in this matter].
European Exam Report in related EP Application No. 15188440.0, dated Apr. 21, 2017, 4 pages [No new art to cite].
Ralph Grabowski, "Smothing 3D Mesh Objects," New Commands in AutoCAD 2010: Part 11, Examiner Cited art in related matter Non Final Office Action dated May 19, 2017; 6 pages.

\* cited by examiner

SYSTEM AND METHOD FOR DIMENSIONING

FIELD OF THE INVENTION

The present invention relates generally to a dimension detection system, and more particularly to a structured-light dimensioning system and method for improving the performance thereof.

BACKGROUND

Generally speaking, a structured-light dimensioning system may project a light pattern onto an object as part of a dimension measurement (i.e., dimensioning). In the best of circumstances, a high-quality image of the light pattern, with easily recognizable patterns on all dimensioning surfaces, is captured. Often, however, the captured light-pattern on one or more surfaces is unsuitable due to the lighting and/or the object's color. Under these circumstances, some adjustment of the structured-light dimensioning system may be necessary.

Neither the time nor the skill is available in some dimensioning applications (e.g., handheld dimensioning) to adjust the structured-light dimensioning system carefully. What is more, in many cases an optimal pattern image, with resolvable light patterns on all dimensioning surfaces, is unobtainable using a single camera setting. Therefore, a need exists for a structured-light dimensioning system with an improved ability to automatically capture a resolvable light pattern on all dimensioning surfaces, especially when the lighting and/or object color make imaging all dimensioning surfaces simultaneously otherwise difficult.

SUMMARY

Accordingly, in one aspect, the present invention embraces a structured-light dimensioning system. The system includes a projector subsystem for projecting a light pattern onto an object that has dimensioning surfaces. The system also includes a camera subsystem for capturing pattern images of the light pattern on the dimensioning surfaces. The system further includes a control subsystem that is communicatively coupled to the projector subsystem and the camera subsystem. The control subsystem includes a processor and a memory. The processor analyzes and processes pattern images, while the memory allows for the storage of pattern images and a software program. When executed by the processor, the software program configures the control subsystem to enable the camera subsystem to capture multiple pattern images using different camera-subsystem settings for each pattern image. The software program also configures the control subsystem to incorporate the multiple pattern images into an image composite with a resolvable light pattern on the dimensioning surfaces.

In an exemplary embodiment, the structured-light dimensioning system is handheld and the image composite includes multiple pattern images aligned and combined to remove differences caused by hand motion.

In another aspect, the present invention embraces a method to compute an object's dimensions using a structured-light dimensioning system. In the method, a pattern image of a light pattern, projected onto the object, is captured. Within the pattern image, dimensioning surfaces on the object are selected, and from these, the dimensioning surfaces that have a requisite pattern for dimensioning are identified. The pattern image is then incorporated into an image composite. Next, the image composite is checked, and if all of the dimensioning surfaces in the image composite have the requisite pattern, then the image composite is processed to compute the object's dimensions. Otherwise, the camera subsystem's settings are adjusted and the process of capturing a pattern image, selecting dimensioning surfaces, identifying the dimensioning surfaces that have a requisite pattern, and incorporating the pattern image into the image composite are repeated. This repetition continues until all of the dimensioning surfaces in the image composite have the requisite pattern for dimensioning, at which point the image composite is processed to compute the object's dimensions.

In an exemplary embodiment, at least three dimensioning surfaces are selected and the object's dimension is the object's volume.

In another exemplary embodiment, the image composite includes multiple pattern images.

The foregoing illustrative summary, as well as other exemplary objectives and/or advantages of the invention, and the manner in which the same are accomplished, are further explained within the following detailed description and its accompanying drawings.

DETAILED DESCRIPTION

Figure 1:
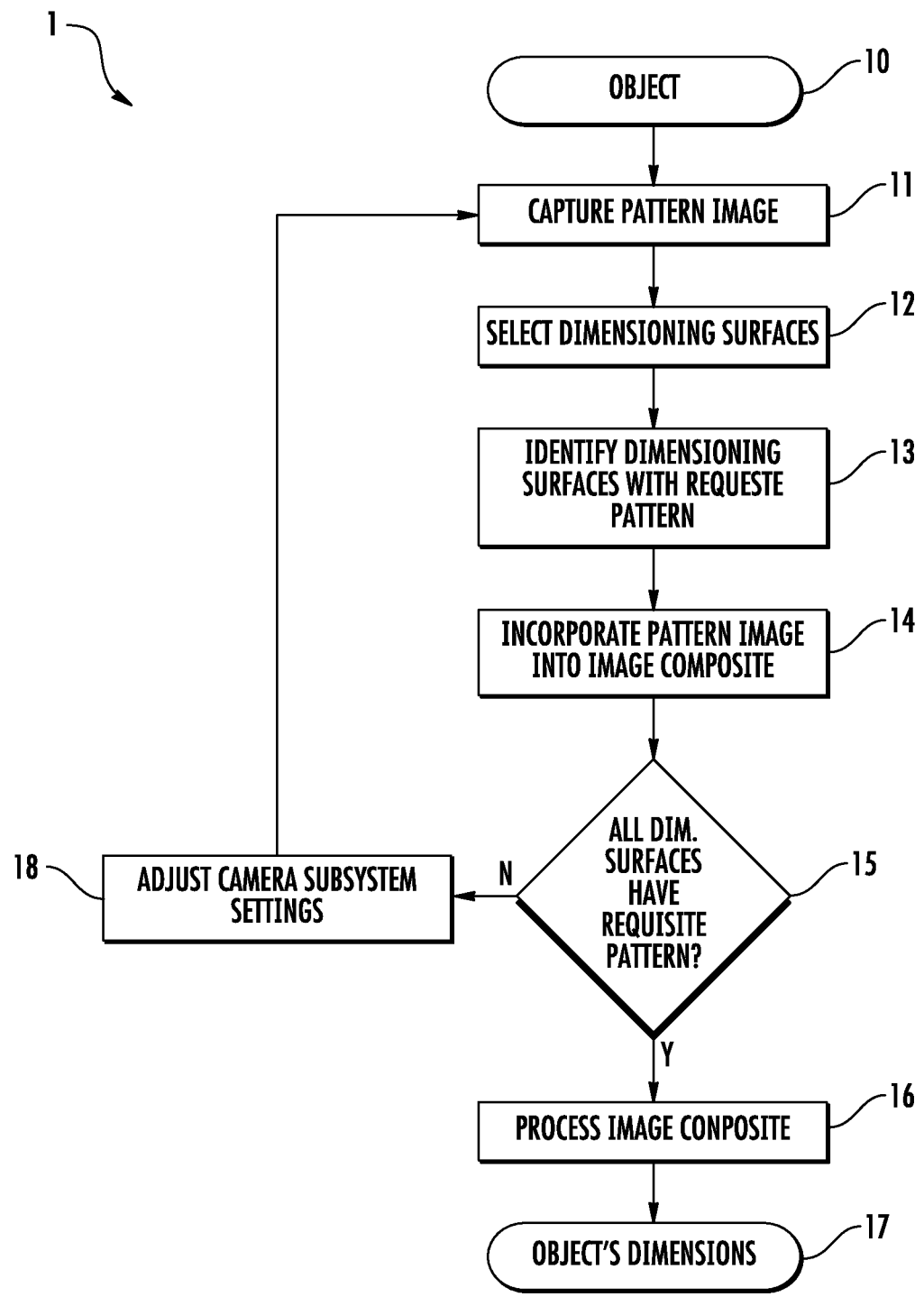
FIG. 1 schematically depicts a block diagram representing an exemplary method to compute an object's dimensions using a structured-light dimensioning system.

Dimensioning is the process of remotely measuring an object's dimensions using a dimensioning system (i.e., dimensioner). Typically, the object analyzed is a cubic package and the dimension measured is the object's volume. Measuring a package's volume is especially important in the shipping and warehousing industries, which may have space and/or weight restrictions. For example, the cost to ship a package has historically been based on the package's weight. Charging by weight alone, however, may cause a shipment of a lightweight package with a large volume to become unprofitable. As a result, dimension measurements are often required to compute shipping costs.

Dimensioning systems may be static in the sense that a package is unmoving during a measurement. Alternatively, a dimensioning system may be dynamic where the package moves during measurement (e.g., moving along a conveyor). In both of these cases, the dimensioning system is mounted in a fixed position and the imaging environment is carefully controlled. The most promising dimensioning system configuration, however, is handheld, which could adapt to almost any environment.

Handheld dimensioning is a challenging problem. In handheld applications, the environment (e.g., the lighting) is uncontrolled and the dimensioner must accommodate non-ideal imaging conditions (e.g., motion associated with being handheld). In addition, handheld applications typical have low tolerance for excessive measurement times or alignment complexities. Thus, the sensing technology chosen for such applications must accommodate these issues.

A variety of sensing technologies have been employed for dimensioning. The present invention embraces a dimensioning system using structured-light sensing. Structure light is the process of projecting a light pattern (e.g., dots, grids, bars, etc.) onto a scene (i.e., field of view). The light pattern may be invisible or may be pulsed at an high rate so as not to interfere with other computer vision tasks, such as barcode scanning or optical character recognition (OCR).

The scene with the projected light pattern is imaged and the pattern image is examined. Objects in the field of view will cause the light pattern in the pattern image to appear deformed when compared to a reference pattern. This deformation may be mathematically processed to compute distance (i.e., range) information. This range information may, in turn, be used to compute an object's dimensions (e.g., the object's volume).

The image quality of the light pattern is key to structured light dimensioning. In some applications, however, lighting variations and/or object color, may negatively affect the pattern image on one, or more, of the object's surfaces. This is especially true for handheld systems that may be operated in a wide range of environments (e.g., in direct sunlight). A pattern image with uneven illumination may not have resolvable pattern elements (e.g., dots) on all surfaces of the object. For example, bright areas may be saturated, washing out the pattern elements, while dark areas may be underexposed, lacking the intensity to resolve the pattern elements.

Uneven lighting may be caused by unfavorable illumination and/or the shape of the object. For example, if a box is illuminated with a beam of light, then the sides of the box opposite to the light source will be in shadow while the sides toward the light source will be fully illuminated. Since the accuracy (or even the possibility) of dimensioning depends on having pattern images with good pattern-element visibility on all dimensioning surfaces, it is important to capture pattern images of suitable quality. One camera setting may not be suitable, however, for obtaining good pattern images on each surface. For example, the correct exposure for one surface may overexpose another surface. Moving to a different location may help the imaging problem but may not be convenient in some applications. The present invention embraces the idea of capturing multiple pattern images using different camera settings (e.g., shutter speed or aperture size), so that when combined (i.e., mathematical combination) or used in combination, provide all of the necessary dimensioning information.

As mentioned previously, a handheld dimensioner may project a light pattern onto an object and then capture an image (i.e., a pattern image) of the object with the overlaid light pattern. The pattern in the image may then be compared with a reference pattern and variations between the two patterns may be used to calculate the distance of various pattern elements (e.g., sets of dots) on a surface. Clearly, this method will not work when the pattern elements on the surface cannot be imaged. An important aspect of this invention is the realization that while dimensioning needs well-imaged patterns from a plurality of surfaces, these patterns need not be imaged simultaneously, nor do they need to be imaged with the same camera settings (e.g., exposure time).

Unlike conventional images that capture all of the visible details of a scene, pattern images are used for sensing pattern distortions caused by the scene. This information may be used to compute the range of small groups of pattern elements on the surface. Once this calculation has been performed for a surface, this surface need not be imaged again unless the dimensioner has been moved appreciably. Pattern images for other surfaces may then be captured (e.g., using different camera settings) to give a composite image with a requisite pattern for range calculations. Once all of the surfaces have been imaged with the requisite pattern and their range calculations have been performed, then the object's volume may be computed.

Small motion variations between the pattern images may be compensated by aligning the pattern images. If, for example, three dimensioning-surfaces are required, then at least three pattern-images may be captured. The three pattern images may then be aligned (e.g., aligning the object edges in each image) and overlaid. Alignment between the images can be accomplished in an exemplary embodiment by using a method called iterative closest point (i.e., ICP). This method can correct the small differences. Only small difference between pattern images during a dimensioning measurement is expected since multiple (e.g., three) surfaces may be acquired quickly (e.g., within a quarter of a second).

The fastest way to use the pattern images is to acquire the first set of dots on a dimensioning surface and then ignore that dimensioning surface on future image acquisitions until the image composite has a useable pattern. Alternately, surfaces with two or more independent sets of visible pattern elements can be used to make multiple range measurements for each surface. These multiple measurements can then be averaged or otherwise mathematically combined to produce a more accurate range measurement for that side. The present invention, therefore, also offers an improved method for acquiring the information necessary for dimensioning since the same pattern may be acquired multiple times during a dimensioning measurement and thus may have an improved signal-to-noise ratio (i.e., SNR).

A block diagram representing an exemplary method to compute an object's dimensions using a structured-light dimensioning system (e.g., handheld structured-light dimensioning system) is shown in FIG. 1. The method 1 starts with an object 10 for dimensioning. This object 10 is typically a package and the goal of the method 1 is typically to compute the volume of this package. The object size is typically constrained within a prescribe range, and the object typically must be placed roughly at a prescribed distance from the dimensioner during measurement. The exact prescribed values are related to a projector subsystem that projects the light pattern and a camera subsystem that captures a pattern image of the light pattern reflected from the object.

A small item, for example, placed a faraway from the dimensioner will not have a reflected pattern density (i.e., the density of pattern elements reflected from an object's surface) sufficient for a range calculation. Likewise, a large item placed too close to the dimensioner will fill the scene to such an extent that only a portion of a single surface may be imaged. Thus adjusting the field of view for the projector and camera subsystems as well as the pattern density and the image resolution are important factors in determining the operating range of the dimensioner.

The dimensioner captures a pattern image 11 by projecting a light pattern onto the object and then capturing an image of the object with the overlaid light pattern. The light projected may be infrared (IR), visible, or ultraviolet (UV) but is typically IR. The light may be pulsed or continuous during the dimensioning process. The pattern may be dynamic or static and may consist of projected patterns including geometrical shapes (e.g., hexagons or line grids), dot arrays, and/or Du Bruijn diagrams. In an exemplary dot pattern (i.e., the pattern elements are dots) the size, shape, and distribution of the dot pattern are known and may be stored in memory as a reference pattern.

The captured image is analyzed and dimensioning surfaces are selected 12. The detection and selection of dimensioning surfaces may be accomplished with an image analysis algorithm known as image segmentation. For example, a box may have three surfaces selected for dimensioning. These three surfaces can be used then to determine the box's volume.

Once the dimensioning surfaces are selected 12 the light pattern's quality on each surface is be examined. Surfaces with the requisite pattern for dimensioning are identified 13. A requisite pattern is a pattern that is discernable in a pattern image. For example, a dot pattern on a surface that is saturated is not discernable and neither is a dot pattern with an insufficient reflected intensity resulting from an object that has a low reflectance (i.e., low with respect to the light pattern's wavelength).

Images with a requisite surface patterns may be incorporated into an image composite 14. An image composite may be a set of individual images, a resulting image from the combination of one or more images, or a portion of an image or images (i.e., segmented surface data).

The composite image must have a requisite number of dimensioning surfaces with discernable patterns for dimensioning. As a result, a condition 15 is included in the method. The condition 15 has two alternatives: (i) if all the selected dimensioning surfaces have the requisite pattern, then the image composite is processed 16 resulting in the object's dimension 17, otherwise (ii) the camera settings are adjusted 18 and a new pattern image is acquired and the process repeats.

Collecting pattern images until all selected dimensioning surfaces in the image composite have the requisite pattern for dimensioning (i.e., composing the image composite) can be executed in a variety of ways. The fastest way to compose the image composite is to store the first set of pattern elements on a dimensioning surface and then ignore that dimensioning surface on subsequently acquired pattern images until the image composite has a useable pattern on all dimensioning surfaces. Alternately, dimensioning surfaces with two or more independent pattern images can be processed and these multiple measurements can be averaged or otherwise combined to reach a more accurate measurement of that surface.

Figure 2:
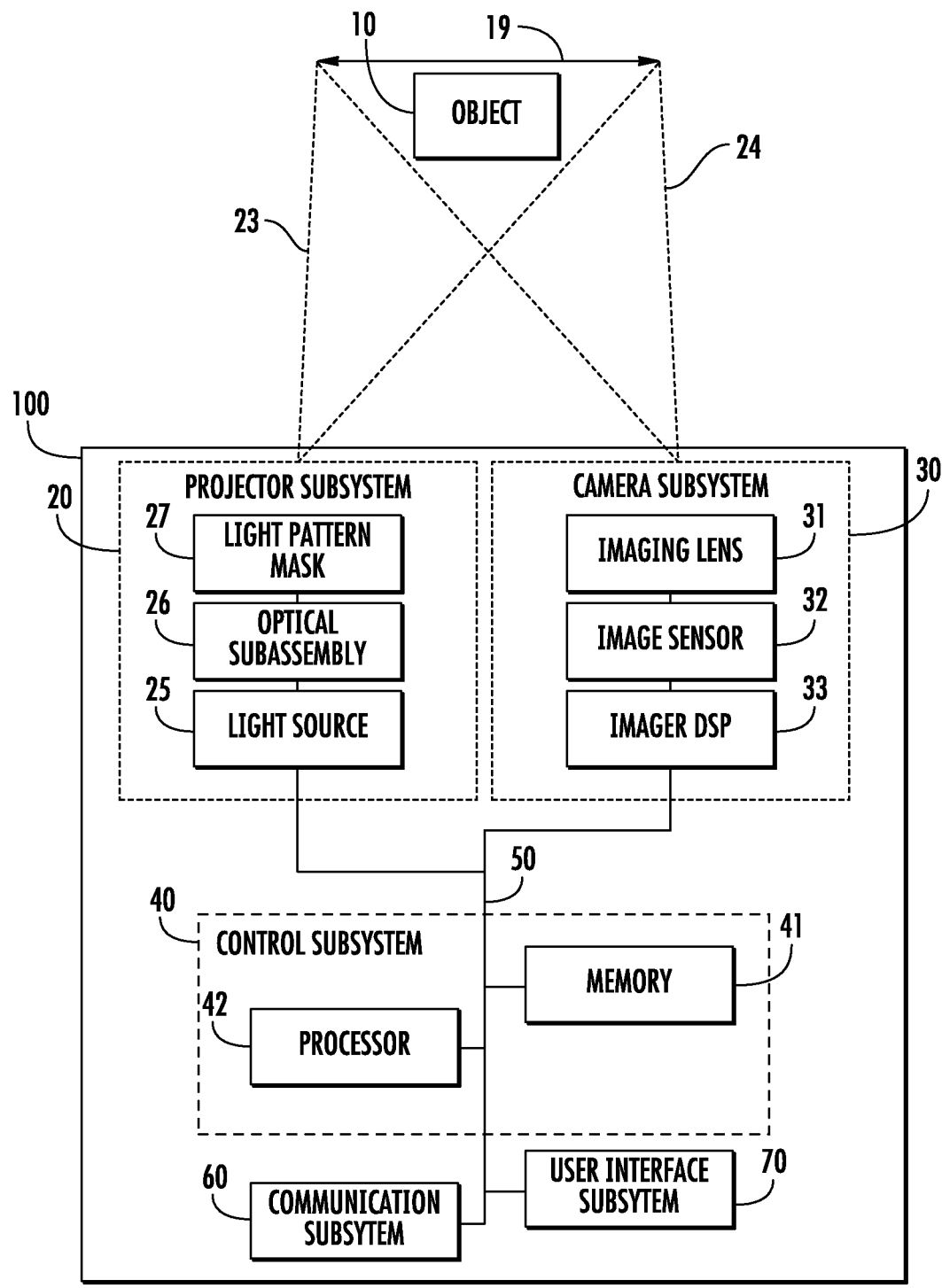
FIG. 2 schematically depicts an exemplary embodiment of a structured-light dimensioning system block diagram.

An exemplary embodiment of a structured-light dimensioning system 100 (i.e., dimensioner) block diagram is shown in FIG. 2. A dimensioner 100 may be positioned with an object 10 in its field of view 24. The object may have its dimensions (e.g., volume) measured remotely. To accomplish this measurement, the dimensioner 100 utilizes a variety of subsystems.

A projector subsystem 20 projects a light pattern 23 onto an object's dimensioning surfaces. The object 10 is positioned within a dimensioning region 19. The projector subsystem 20 has a light source 25 to generate and radiate light. The light source 25 may be a laser diode (LD) or a light emitting diode (LED), either of which may generate light radiation in the ultraviolet (UV), visible (VIS) or infra-red (IR) portions of the spectrum. An optical subassembly 26 is included in the projector subsystem 20 to focus and/or filter the light. A focusing element in the optical subassembly may be a lens or a diffractive optical element (DOE). A light pattern mask 27 is typically used to create the light pattern 23.

A camera subsystem 30 captures pattern images of the object 10 and the projected light pattern 23. To accomplish this, the camera subsystem 30 may use an imaging lens 31 to render a real image of the imaging lens's field of view 24 onto an image sensor 32. This imaging lens field of view 24 overlaps at least partially with the projected light pattern 23. The image sensor 32 may be a charge coupled device (i.e., CCD) or a sensor using complementary metal oxide semiconductor (i.e., CMOS) technology. The image sensor 32 includes a plurality of pixels that sample the real image and convert the real-image intensity into an electronic signal. An imager digital signal processor (i.e., DSP) 33 is typically included to convert the electronic signals from the image sensor 32 into a digital signal.

A control subsystem 40 is communicatively coupled to the projector subsystem 20 and the camera subsystem 30 via an interconnection system (e.g., bus) 50, which interconnects all of the dimensioners subsystems. The control subsystem 40 includes one or more processors 42 (e.g., one or more controllers, digital signal processor (DSP), application specific integrated circuit (ASIC), programmable gate array (PGA), and/or programmable logic controller (PLC)) to configure subsystems for the generation and capturing processes and then perform the processing necessary on pattern images and the image composite necessary for dimensioning. The processor 42 is typically configured by a software program stored in memory 41 (e.g., read only memory (ROM), flash memory, random access memory (RAM), and/or a hard-drive). The software program, when executed by the processor 42 configures the control subsystem to enable the camera subsystem 20 to: (i) capture multiple pattern images, each pattern image captured using different camera-subsystem settings and (ii) incorporate the multiple pattern images into an image composite with a resolvable light pattern on all dimensioning surfaces.

The dimensioner 100 may also include a user interface 70 to display dimension measurements (e.g., linear dimension or volume) results. In some embodiments, the user interface 70 may also facilitate the selection of dimensioning surfaces.

The dimensioner 100 may also include a communication subsystem 60 for transmitting and receiving information to/from a separate computing device or storage device. This communication subsystem may be wired or wireless and may enable communication with a variety of protocols (e.g., IEEE 802.11, including WI-FI®, BLUETOOTH®, CDMA, TDMA, or GSM).

The subsystems in the dimensioner 100 are electrically connected via a couplers (e.g., wires or fibers), buses, and control lines to form an interconnection system 50. The interconnection system 50 may include power buses or lines, data buses, instruction buses, address buses, etc., which allow operation of the subsystems and interaction there between.

To supplement the present disclosure, this application incorporates entirely by reference the following commonly assigned patents, patent application publications, and patent applications:

U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;

U.S. Pat. No. 8,556,176; U.S. Pat. No. 8,556,177;
U.S. Pat. No. 8,559,767; U.S. Pat. No. 8,599,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. D702,237;
U.S. Pat. No. 8,740,082; U.S. Pat. No. 8,740,085;
U.S. Pat. No. 8,746,563; U.S. Pat. No. 8,750,445;
U.S. Pat. No. 8,752,766; U.S. Pat. No. 8,756,059;
U.S. Pat. No. 8,757,495; U.S. Pat. No. 8,760,563;
U.S. Pat. No. 8,763,909; U.S. Pat. No. 8,777,108;
U.S. Pat. No. 8,777,109; U.S. Pat. No. 8,779,898;
U.S. Pat. No. 8,781,520; U.S. Pat. No. 8,783,573;
U.S. Pat. No. 8,789,757; U.S. Pat. No. 8,789,758;
U.S. Pat. No. 8,789,759; U.S. Pat. No. 8,794,520;
U.S. Pat. No. 8,794,522; U.S. Pat. No. 8,794,526;
U.S. Pat. No. 8,798,367; U.S. Pat. No. 8,807,431;
U.S. Pat. No. 8,807,432; U.S. Pat. No. 8,820,630;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2011/0202554;
U.S. Patent Application Publication No. 2012/0111946;
U.S. Patent Application Publication No. 2012/0138685;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0056285;
U.S. Patent Application Publication No. 2013/0070322;
U.S. Patent Application Publication No. 2013/0075168;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0200158;
U.S. Patent Application Publication No. 2013/0256418;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0278425;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306730;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0341399;
U.S. Patent Application Publication No. 2013/0342717;
U.S. Patent Application Publication No. 2014/0001267;
U.S. Patent Application Publication No. 2014/0002828;
U.S. Patent Application Publication No. 2014/0008430;
U.S. Patent Application Publication No. 2014/0008439;
U.S. Patent Application Publication No. 2014/0025584;
U.S. Patent Application Publication No. 2014/0027518;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061305;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0075846;
U.S. Patent Application Publication No. 2014/0076974;
U.S. Patent Application Publication No. 2014/0078341;
U.S. Patent Application Publication No. 2014/0078342;
U.S. Patent Application Publication No. 2014/0078345;
U.S. Patent Application Publication No. 2014/0084068;
U.S. Patent Application Publication No. 2014/0097249;
U.S. Patent Application Publication No. 2014/0098792;
U.S. Patent Application Publication No. 2014/0100774;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0108682;
U.S. Patent Application Publication No. 2014/0110485;
U.S. Patent Application Publication No. 2014/0114530;
U.S. Patent Application Publication No. 2014/0124577;

U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0160329;
U.S. Patent Application Publication No. 2014/0166755;
U.S. Patent Application Publication No. 2014/0166757;
U.S. Patent Application Publication No. 2014/0166759;
U.S. Patent Application Publication No. 2014/0166760;
U.S. Patent Application Publication No. 2014/0166761;
U.S. Patent Application Publication No. 2014/0168787;
U.S. Patent Application Publication No. 2014/0175165;
U.S. Patent Application Publication No. 2014/0175169;
U.S. Patent Application Publication No. 2014/0175172;
U.S. Patent Application Publication No. 2014/0175174;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0203087;
U.S. Patent Application Publication No. 2014/0204268;
U.S. Patent Application Publication No. 2014/0214631;
U.S. Patent Application Publication No. 2014/0217166;
U.S. Patent Application Publication No. 2014/0217180;
U.S. patent application Ser. No. 13/367,978 for a Laser Scanning Module Employing An Elastomeric U-Hinge Based Laser Scanning Assembly, filed Feb. 7, 2012 (Feng et al.);
U.S. patent application No. 29/436,337 for an Electronic Device, filed Nov. 5, 2012 (Fitch et al.);
U.S. patent application Ser. No. 13/771,508 for an Optical Redirection Adapter, filed Feb. 20, 2013 (Anderson);
U.S. patent application Ser. No. 13/852,097 for a System and Method for Capturing and Preserving Vehicle Event Data, filed Mar. 28, 2013 (Barker et al.);
U.S. patent application Ser. No. 13/902,110 for a System and Method for Display of Information Using a Vehicle-Mount Computer, filed May 24, 2013 (Hollifield);
U.S. patent application Ser. No. 13/902,144, for a System and Method for Display of Information Using a Vehicle-Mount Computer, filed May 24, 2013 (Chamberlin);
U.S. patent application Ser. No. 13/902,242 for a System For Providing A Continuous Communication Link With A Symbol Reading Device, filed May 24, 2013 (Smith et al.);
U.S. patent application Ser. No. 13/912,262 for a Method of Error Correction for 3D Imaging Device, filed Jun. 7, 2013 (Jovanovski et al.);
U.S. patent application Ser. No. 13/912,702 for a System and Method for Reading Code Symbols at Long Range Using Source Power Control, filed Jun. 7, 2013 (Xian et al.);
U.S. patent application No. 29/458,405 for an Electronic Device, filed Jun. 19, 2013 (Fitch et al.);
U.S. patent application Ser. No. 13/922,339 for a System and Method for Reading Code Symbols Using a Variable Field of View, filed Jun. 20, 2013 (Xian et al.);
U.S. patent application Ser. No. 13/927,398 for a Code Symbol Reading System Having Adaptive Autofocus, filed Jun. 26, 2013 (Todeschini);
U.S. patent application Ser. No. 13/930,913 for a Mobile Device Having an Improved User Interface for Reading Code Symbols, filed Jun. 28, 2013 (Gelay et al.);
U.S. patent application No. 29/459,620 for an Electronic Device Enclosure, filed Jul. 2, 2013 (London et al.);
U.S. patent application No. 29/459,681 for an Electronic Device Enclosure, filed Jul. 2, 2013 (Chaney et al.);
U.S. patent application Ser. No. 13/933,415 for an Electronic Device Case, filed Jul. 2, 2013 (London et al.);
U.S. patent application No. 29/459,785 for a Scanner and Charging Base, filed Jul. 3, 2013 (Fitch et al.);
U.S. patent application No. 29/459,823 for a Scanner, filed Jul. 3, 2013 (Zhou et al.);
U.S. patent application Ser. No. 13/947,296 for a System and Method for Selectively Reading Code Symbols, filed Jul. 22, 2013 (Rueblinger et al.);
U.S. patent application Ser. No. 13/950,544 for a Code Symbol Reading System Having Adjustable Object Detection, filed Jul. 25, 2013 (Jiang);
U.S. patent application Ser. No. 13/961,408 for a Method for Manufacturing Laser Scanners, filed Aug. 7, 2013 (Saber et al.);
U.S. patent application Ser. No. 14/018,729 for a Method for Operating a Laser Scanner, filed Sep. 5, 2013 (Feng et al.);
U.S. patent application Ser. No. 14/019,616 for a Device Having Light Source to Reduce Surface Pathogens, filed Sep. 6, 2013 (Todeschini);
U.S. patent application Ser. No. 14/023,762 for a Handheld Indicia Reader Having Locking Endcap, filed Sep. 11, 2013 (Gannon);
U.S. patent application Ser. No. 14/035,474 for Augmented-Reality Signature Capture, filed Sep. 24, 2013 (Todeschini);
U.S. patent application No. 29/468,118 for an Electronic Device Case, filed Sep. 26, 2013 (Oberpriller et al.);
U.S. patent application Ser. No. 14/055,234 for Dimensioning System, filed Oct. 16, 2013 (Fletcher);
U.S. patent application Ser. No. 14/053,314 for Indicia Reader, filed Oct. 14, 2013 (Huck);
U.S. patent application Ser. No. 14/065,768 for Hybrid System and Method for Reading Indicia, filed Oct. 29, 2013 (Meier et al.);
U.S. patent application Ser. No. 14/074,746 for Self-Checkout Shopping System, filed Nov. 8, 2013 (Hejl et al.);
U.S. patent application Ser. No. 14/074,787 for Method and System for Configuring Mobile Devices via NFC Technology, filed Nov. 8, 2013 (Smith et al.);
U.S. patent application Ser. No. 14/087,190 for Optimal Range Indicators for Bar Code Validation, filed Nov. 22, 2013 (Hejl);
U.S. patent application Ser. No. 14/094,087 for Method and System for Communicating Information in an Digital Signal, filed Dec. 2, 2013 (Peake et al.);
U.S. patent application Ser. No. 14/101,965 for High Dynamic-Range Indicia Reading System, filed Dec. 10, 2013 (Xian);
U.S. patent application Ser. No. 14/150,393 for Inciciareader Having Unitary Construction Scanner, filed Jan. 8, 2014 (Colavito et al.);

U.S. patent application Ser. No. 14/154,207 for Laser Barcode Scanner, filed Jan. 14, 2014 (Hou et al.);

U.S. patent application Ser. No. 14/165,980 for System and Method for Measuring Irregular Objects with a Single Camera filed Jan. 28, 2014 (Li et al.);

U.S. patent application Ser. No. 14/166,103 for Indicia Reading Terminal Including Optical Filter filed Jan. 28, 2014 (Lu et al.);

U.S. patent application Ser. No. 14/200,405 for Indicia Reader for Size-Limited Applications filed Mar. 7, 2014 (Feng et al.);

U.S. patent application Ser. No. 14/231,898 for Hand-Mounted Indicia-Reading Device with Finger Motion Triggering filed Apr. 1, 2014 (Van Horn et al.);

U.S. patent application Ser. No. 14/250,923 for Reading Apparatus Having Partial Frame Operating Mode filed Apr. 11, 2014, (Deng et al.);

U.S. patent application Ser. No. 14/257,174 for Imaging Terminal Having Data Compression filed Apr. 21, 2014, (Barber et al.);

U.S. patent application Ser. No. 14/257,364 for Docking System and Method Using Near Field Communication filed Apr. 21, 2014 (Showering);

U.S. patent application Ser. No. 14/264,173 for Autofocus Lens System for Indicia Readers filed Apr. 29, 2014 (Ackley et al.);

U.S. patent application Ser. No. 14/274,858 for Mobile Printer with Optional Battery Accessory filed May 12, 2014 (Marty et al.);

U.S. patent application Ser. No. 14/277,337 for MULTIPURPOSE OPTICAL READER, filed May 14, 2014 (Jovanovski et al.);

U.S. patent application Ser. No. 14/283,282 for TERMINAL HAVING ILLUMINATION AND FOCUS CONTROL filed May 21, 2014 (Liu et al.);

U.S. patent application Ser. No. 14/300,276 for METHOD AND SYSTEM FOR CONSIDERING INFORMATION ABOUT AN EXPECTED RESPONSE WHEN PERFORMING SPEECH RECOGNITION, filed Jun. 10, 2014 (Braho et al.);

U.S. patent application Ser. No. 14/305,153 for INDICIA READING SYSTEM EMPLOYING DIGITAL GAIN CONTROL filed Jun. 16, 2014 (Xian et al.);

U.S. patent application Ser. No. 14/310,226 for AUTOFOCUSING OPTICAL IMAGING DEVICE filed Jun. 20, 2014 (Koziol et al.);

U.S. patent application Ser. No. 14/327,722 for CUSTOMER FACING IMAGING SYSTEMS AND METHODS FOR OBTAINING IMAGES filed Jul. 10, 2014 (Oberpriller et al,);

U.S. patent application Ser. No. 14/327,827 for a MOBILE-PHONE ADAPTER FOR ELECTRONIC TRANSACTIONS, filed Jul. 10, 2014 (Hejl);

U.S. patent application Ser. No. 14/329,303 for CELL PHONE READING MODE USING IMAGE TIMER filed Jul. 11, 2014 (Coyle);

U.S. patent application Ser. No. 14/333,588 for SYMBOL READING SYSTEM WITH INTEGRATED SCALE BASE filed Jul. 17, 2014 (Barten);

U.S. patent application Ser. No. 14/334,934 for a SYSTEM AND METHOD FOR INDICIA VERIFICATION, filed Jul. 18, 2014 (Hejl);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Reublinger et al.);

U.S. patent application Ser. No. 14/340,716 for an OPTICAL IMAGER AND METHOD FOR CORRELATING A MEDICATION PACKAGE WITH A PATIENT, filed Jul. 25, 2014 (Ellis);

U.S. patent application Ser. No. 14/342,544 for Imaging Based Barcode Scanner Engine with Multiple Elements Supported on a Common Printed Circuit Board filed Mar. 4, 2014 (Liu et al.);

U.S. patent application Ser. No. 14/345,735 for Optical Indicia Reading Terminal with Combined Illumination filed Mar. 19, 2014 (Ouyang);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/355,613 for Optical Indicia Reading Terminal with Color Image Sensor filed May 1, 2014 (Lu et al.);

U.S. patent application Ser. No. 14/370,237 for WEB-BASED SCAN-TASK ENABLED SYSTEM AND METHOD OF AND APPARATUS FOR DEVELOPING AND DEPLOYING THE SAME ON A CLIENT-SERVER NETWORK filed Jul. 2, 2014 (Chen et al.);

U.S. patent application Ser. No. 14/370,267 for INDUSTRIAL DESIGN FOR CONSUMER DEVICE BASED SCANNING AND MOBILITY, filed Jul. 2, 2014 (Ma et al.);

U.S. patent application Ser. No. 14/376,472, for an ENCODED INFORMATION READING TERMINAL INCLUDING HTTP SERVER, filed Aug. 4, 2014 (Lu);

U.S. patent application Ser. No. 14/379,057 for METHOD OF USING CAMERA SENSOR INTERFACE TO TRANSFER MULTIPLE CHANNELS OF SCAN DATA USING AN IMAGE FORMAT filed Aug. 15, 2014 (Wang et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/460,387 for APPARATUS FOR DISPLAYING BAR CODES FROM LIGHT EMITTING DISPLAY SURFACES filed Aug. 15, 2014 (Van Horn et al.);

U.S. patent application Ser. No. 14/460,829 for ENCODED INFORMATION READING TERMINAL WITH WIRELESS PATH SELECTION CAPABILITY, filed Aug. 15, 2014 (Wang et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/446,387 for INDICIA READING TERMINAL PROCESSING PLURALITY OF FRAMES OF IMAGE DATA RESPONSIVELY TO TRIGGER SIGNAL ACTIVATION filed Jul. 30, 2014 (Wang et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application No. 29/486,759 for an Imaging Terminal, filed Apr. 2, 2014 (Oberpriller et al.);

U.S. patent application No. 29/492,903 for an INDICIA SCANNER, filed Jun. 4, 2014 (Zhou et al.); and U.S. patent application No. 29/494,725 for an IN-COUNTER BARCODE SCANNER, filed Jun. 24, 2014 (Oberpriller et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A structured-light dimensioning system, comprising:
   a projector subsystem for projecting a light pattern onto an object having dimensioning surfaces to cause pattern distortions of the light pattern;
   a camera subsystem for capturing pattern images, the pattern images comprising the light pattern on the dimensioning surfaces;
   a control subsystem communicatively coupled to the projector subsystem and the camera subsystem, the control subsystem comprising (i) a processor for analyzing and processing the pattern images and (ii) a memory for storing the pattern images and a software program, wherein
   the software program when executed by the processor configures the control subsystem to (i) enable the camera subsystem to capture multiple pattern images, each pattern image captured using different camera-subsystem settings, (ii) incorporate the multiple pattern images into an image composite with a resolvable light pattern on the dimensioning surfaces, and (iii) use the pattern distortions in the image composite to compute a range.

2. The structured-light dimensioning system according to claim 1, wherein the structured-light dimensioning system is capable of being handheld.

3. The structured-light dimensioning system according to claim 2, wherein the image composite comprises multiple pattern images aligned and combined to remove differences caused by hand motion.

4. The structured-light dimensioning system according to claim 1, wherein the projected light pattern is an infrared (IR) pattern of dots.

5. The structured-light dimensioning system according to claim 1, wherein the resolvable light pattern comprises at least one visible pattern element.

6. The structured-light dimensioning system according to claim 1, wherein the composite image comprises segmented pattern images.

7. The structured-light dimensioning system according to claim 1, wherein the composite image comprises a single image that is a mathematical combination of pattern images.

8. The structured-light dimensioning system according to claim 1, wherein the camera-subsystem settings comprise an image-sensor shutter speed.

9. The structured-light dimensioning system according to claim 1, wherein the camera-subsystem settings comprise an imaging lens aperture size.

10. The structured-light dimensioning system according to claim 1, wherein the software program configures the control subsystem to identify dimensioning surfaces in a pattern image.

11. The structured-light dimensioning system according to claim 1, wherein the software program configures the control subsystem to compute an object volume using the image composite.

12. A method to compute an object's dimensions using a structured-light dimensioning system, the method comprising:
   projecting a light pattern onto an object to cause pattern distortions of the light pattern;
   capturing a pattern image of the light pattern projected onto the object;
   selecting dimensioning surfaces on the object in the pattern image;
   identifying dimensioning surfaces that have a requisite pattern for dimensioning;
   incorporating the pattern image into an image composite;
   adjusting a camera subsystem's settings and repeating the capturing, selecting, identifying, and incorporating until the image composite has the requisite pattern for dimensioning on all dimensioning surfaces; and
   processing the image composite to compute the object's dimensions, comprising using pattern distortions in the image composite to compute a range.

13. The method according to claim 12, wherein at least three dimensioning surfaces are selected and the object's dimension is the object's volume.

14. The method according to claim 12, wherein the image composite comprises at least two pattern images.

15. The method according to claim 12, wherein the image composite comprises a combination of pattern images into a single image.

16. The method according to claim 12, wherein the requisite pattern comprises at least one discernable pattern element.

17. The method according to claim 12, wherein, the processing of the image composite comprises computing at least one range between the structured light dimensioning system and at least one dimensioning surface.

18. The method according to claim 12, wherein the camera subsystem settings comprises an image sensor's exposure time.

19. The method according to claim 12, wherein the camera subsystem settings comprises an image-lens aperture size.

20. A structured-light dimensioning system, comprising:
   a projector subsystem for projecting a light pattern onto an object having dimensioning surfaces to cause pattern distortions of the light pattern;
   a camera subsystem for capturing pattern images, the pattern images comprising the light pattern on the dimensioning surfaces;
   a control subsystem communicatively coupled to the projector subsystem and the camera subsystem, the control subsystem comprising (i) a processor for analyzing and processing the pattern images and (ii) a memory for storing the pattern images and a software program, wherein
   the software program when executed by the processor configures the control subsystem to (i) enable the camera subsystem to capture multiple pattern images, each pattern image captured using different camera-subsystem settings, (ii) incorporate the multiple pattern images into an image composite with a resolvable light pattern on the dimensioning surfaces, and (iii) use the pattern distortions in the image composite to compute a volume of the object.

* * * * *